US012595438B2

(12) United States Patent
Trailokya et al.

(10) Patent No.: US 12,595,438 B2
(45) Date of Patent: Apr. 7, 2026

(54) BIODEGRADABLE QUATERNARY AMMONIUM COMPOUND

(71) Applicant: GALAXY SURFACTANTS LTD., Navi Mumbai (IN)

(72) Inventors: Sagar A. Trailokya, New Panvel (IN); Bhooshan Thakur, Taluka And District Palghar (IN); Vaishali A. Jumde, Kamothe (IN); Shraddha Ratnaparkhe, Thane West (IN); Dattaprasad Koyande, Katrap Badlapur (IN); Sneha S. Ghadigaonkar, Thane (IN)

(73) Assignee: GALAXY SURFACTANTS LTD. (IN)

( * ) Notice: Subject to any disclaimer, the term of this patent is extended or adjusted under 35 U.S.C. 154(b) by 713 days.

(21) Appl. No.: 18/067,134

(22) Filed: Dec. 16, 2022

(65) Prior Publication Data

US 2023/0203399 A1 Jun. 29, 2023

(30) Foreign Application Priority Data

Dec. 23, 2021 (IN) ............................. 202121060369

(51) Int. Cl.
*C11D 1/62* (2006.01)
*C11D 3/00* (2006.01)
*C11D 11/00* (2006.01)

(52) U.S. Cl.
CPC ................ *C11D 1/62* (2013.01); *C11D 3/001* (2013.01); *C11D 11/0082* (2013.01); *C11D 2111/12* (2024.01)

(58) Field of Classification Search
CPC ....... C11D 1/62; C11D 3/001; C11D 11/0017; C11D 11/0082
See application file for complete search history.

(56) References Cited

U.S. PATENT DOCUMENTS 5,879,589 A * 3/1999 Miyanaga ................ C08K 9/04 556/400
2007/0151047 A1* 7/2007 Steigerwald ........... A61Q 5/065 8/406

(Continued)

FOREIGN PATENT DOCUMENTS

EP 0192145 A2 * 8/1986 ............... C11D 1/62
WO WO-2013070655 A1 * 5/2013 .......... D06M 15/267

*Primary Examiner* — Mark Eashoo
*Assistant Examiner* — M. Reza Asdjodi
(74) *Attorney, Agent, or Firm* — Fox Rothschild LLP

(57) ABSTRACT

Substantive, biodegradable, antimicrobial—diamidoquats of Formula I, comprising a quaternary ammonium center and amide functionality and having conditioning properties along with good antimicrobial efficacy wherein, R and R1 are selected from $C_6$ to $C_{24}$. Home care, fabric care composition comprising novel compounds are effective even at lower dosage compared to other traditional conditioning compounds.

Formula I

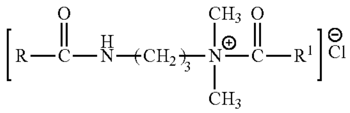

wherein, R and $R^1$ may or may not be same and are selected from $C_6$ to $C_{24}$ straight or branched chain alkyl or alkenyl residue.

8 Claims, 4 Drawing Sheets

(56) References Cited

U.S. PATENT DOCUMENTS

| | | | | |
|---|---|---|---|---|
| 2008/0242584 | A1* | 10/2008 | Wahl | C11D 3/3769<br>510/517 |
| 2014/0101868 | A1* | 4/2014 | Hoffmann | A61K 8/585<br>8/408 |
| 2014/0315779 | A1* | 10/2014 | Zander | D06M 13/463<br>510/527 |
| 2023/0203399 | A1* | 6/2023 | Trailokya | C11D 3/32<br>510/330 |
| 2023/0404880 | A1* | 12/2023 | Vaidya | A61K 8/466 |

* cited by examiner

Esterquat formulations at different dosage studied for deposition of cationic molecule shown in above pictures.

Diamidoquat formulations at different dosage studied for deposition of cationic molecule, showed good deposition.

Terry towel sensory panel evaluation for softening improvement.

BIODEGRADABLE QUATERNARY AMMONIUM COMPOUND

CROSS-REFERENCE TO RELATED APPLICATION

This application claims the benefit of priority to Indian Patent Application number 202121060369 filed Dec. 23, 2021, the disclosure of which is hereby incorporated by reference in its entirety.

TECHNICAL FIELD OF THE INVENTION

The present invention relates to preparation of a novel, quaternary ammonium compound. Particularly, it relates to opaque, solid flakes/paste of quaternary ammonium compounds substantially different from traditional esterquats (EQ) in terms of conditioning. More particularly, the novel quaternary ammonium compound diamidoquat (DAQ) of the present invention delivers fabric conditioning/softening property on fabric when applied during rinse cycle and is effective at lower dosage compared to traditional esterquats. The diamidoquat of the present invention is biodegradable, antistatic, substantive, exhibit antimicrobial properties and delivers non-yellowing effect on fabric even after multi-washing cycles.

BACKGROUND AND PRIOR ART

Quaternary ammonium compounds, especially esterquats are known as one of the traditional fabric softening molecules with their widespread application in fabric conditioner compositions. They provide good fabric softening and are globally available. However, the difficulty is in active component dissolution, their lower biodegradability and yellowing of fabric are the major pain areas for formulators and therefore they are typically mixed with other supplementary ingredients.

Further, the manufacturing process of esterquats involve highly flammable solvents such as IPA/Ethanol and requires extensive safety precautions during handling and processing. During manufacturing of esterquats, dimethyl sulfate is being used which is toxic/hazardous carcinogenic and mutagenic, highly poisonous, corrosive, and environmentally hazardous and hence it must be avoided during processing. Moreover, in aqueous medium at highly acidic or alkaline conditions, being organic esters, esterquats undergo hydrolysis and therefore are not stable. This issue creates problem during shelf-life of finished products leading to their phase separation.

The incorporation of solid esterquats in fabric conditioner compositions requires high temperature, high energy and is time consuming operation. The obligatorily hot processing also eliminates the incorporation of temperature-sensitive additives, such as essential oils, fragrance etc. Processing the solid esterquats often result in non-uniformity of product, which further decreases the performance and stability of the fabric conditioners.

Esterquats, on account of its good fabric softening, smoothening properties and in particular because of their low cost and easy availability have been employed for many years as raw material in the manufacture of fabric conditioners/softeners. To achieve and enhance the fabric softening benefit, it has been tried in the prior arts that use of esterquats with increasing dosage or combined with other silicon or similar fabric softening molecules.

U.S. Pat. No. 8,722,612B2 discloses the compositions useful as fabric softeners comprising a long chain ketocarbonylquat containing at least one quaternary ammonium group and an organopolysiloxane polymer or siloxane copolymer.

Similarly, U.S. Pat. No. 8,497,234B2 describes a solid textile care composition having a water-soluble carrier, a water-soluble polymer, a textile care compound and a perfume. A solid textile care composition in which the water-soluble carrier is present in particulate form and has an envelope composed of the water-soluble polymer, the textile care compound, and the perfume.

PH11998001867B talks about amine fabric softener actives, prepared in dispersion and/or clear form with materials to improve performance by increasing the cationic charge density. These materials include polycationic compounds, especially cationic polymers; single long-chain cationic compounds; and carboxylic acids that increase the acidity in the rinse, thus lowering pH and increasing the percentage of amine fabric softener active that is protonated. They are not covering about amido based fabric softener and also not discloses about antimicrobial efficacy.

U.S. Pat. No. 9,428,714B2 teaches a method of boosting the performance of a cost-reduced liquid fabric softener comprising a quaternary surfactant fabric softener by adding a quaternary (meth)acrylic polymer that functions dually as a fabric softening active and a rheology modifier. In particular, poly[{2(methacryloyloxy)ethyl}trimethylammonium chloride], poly[{2-(acryloyloxy) ethyl}trimethylammonium chloride], poly[{3(methacryloyloxy)propyl}trimethylammonium chloride], and poly[{3 (acryloyloxy)propyl}trimethylammonium chloride] provide synergistic fabric softening with quaternary surfactants to provide superior fabric softening scores from cost-optimized compositions. These quaternary polymers are very less biodegradable hence add into environmental concern and also do not perform as antimicrobial agent.

Fabric softeners act as lubricants. A lubricant is defined by "Goodman" as a substance having the ability to make the fabric surface slippery and reduce its friction. It was theorized that a reduction of friction between the fabric components by the softener would increase fabric pliability. The strands of the fiber would possess less interfiber and interyarn tensions which would permit them to move more readily against each other. The freedom of movement would account for less wrinkling, more smoothness, softness, greater fluffiness, and easier ironing. However, McNally and McCord warned that excess lubrication might cause increased fiber slippage. A good softener was thought to form a thin monolayer on the fiber surface. A too thick coating creates an unwanted waxy build-up which lead to yellowing of fabric over the time. Due to this built-up effect fabric loses the ability to absorb dirt or sweat. It creates discomfort, leads to skin problems, and reduces the life of fabric. It is known that post multi-wash cycles, esterquats deposit on fabric in higher quantity and hence fabric gets clogged.

It is known from the arts and the products available in the market that most of the fabric softeners available in the market are based on esterquats. However, esterquats show fabric yellowing effect and build up effect on fabric. Additionally, there is serious concern related to stability which results in separation or viscosity drop occurred during shelf life of the product.

Another major disadvantage of using esterquats is they demand elevated temperature for dissolution. These rules out the addition of temperature sensitive additives in the compositions. Furthermore, the ester linkage of esterquat is not stable at high temperatures, it gets hydrolyzed and also highly impacted with low alkaline or acidic conditions in aqueous solutions.

At present, the industry demands fabric conditioner formulae with quick dissolving components, biodegradable, non-toxic, cost effective, having less impurity profile, stable and safe fabric softening molecule, which is substantive to the fabric and delivers antistatic charge.

Hence, there is a need to invent a conditioning molecule fulfilling the requirements of the industry along with giving superior performance and maintaining ecotoxicological balance for home care.

OBJECTIVES OF THE INVENTION i. It is an objective of the present invention to provide a novel, biodegradable, non-toxic and sustainable softening molecule to deliver uniform smoothness and softness in home care products.
ii. It is another objective of the present invention to provide stable, homogeneous composition with diamidoquats which effectively delivers best fabric conditioning and renders with no build up effect to fabric.
iii. It is another objective of the present invention to provide the laundry care formulations with the novel fabric softening diamidoquats which are compatible with anionic surfactants.
iv. It is another objective of the present invention to provide the novel fabric conditioner system which is stable at pH between 2 to 3.
v. It is another objective of the present invention to provide the novel fabric conditioning compounds giving superior results even at low concentration compared to those containing esterquats.
vi. It is another objective of the present invention to provide effective fabric softeners which are stable over the broad range of temperature between 15° C. to 50° C.
vii. It is another objective of the present invention to provide a fabric care and home/surface care compositions having inbuilt antimicrobial efficacy.

SUMMARY OF THE INVENTION

The present invention relates to novel diamidoquats conditioning molecule comprising quaternary ammonium centre and amide moiety and is an effective fabric conditioning agent which provides uniform fabric softening and smoothening effect on fabric through rinse off cycle during fabric wash and is self-preserving molecule.

Formula I

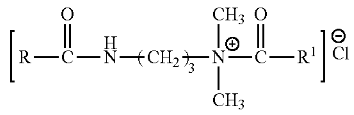

wherein, R and $R^1$ may or may not be same and are selected from $C_6$ to $C_{24}$ straight or branched alkyl chain or alkenyl residue.

"Solid flakes of Diamidoquat", of the present invention are opaque and easy to disperse in water with emulsifier. It can be stored for extended period over a wide range of temperature such as room temperature (around 25° C.), elevated temperature (40-50° C.) and cold temperature (around 5° C.) without precipitation or decomposition of quaternary compound, hence offering stable final compositions.

The novel fabric conditioner molecule-diamidoquats are in solid flakes form, easy to handle, effective even at lower dosage compared to other conditioning molecules and deliver antistatic and antimicrobial property.

DETAILED DESCRIPTION OF THE INVENTION

Figure 1A:
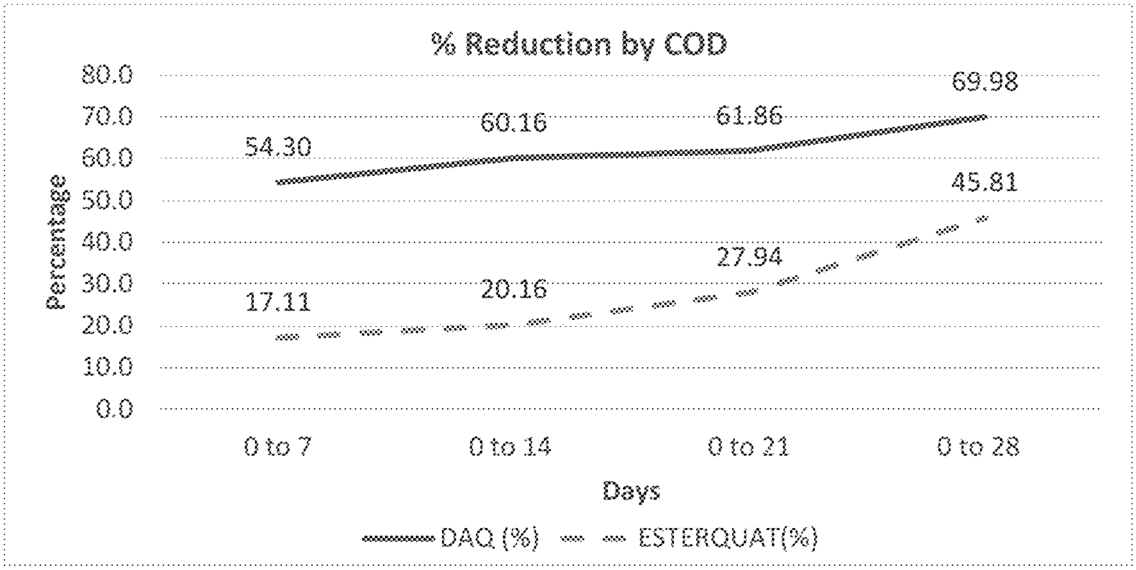
FIG. 1A: Percentage reduction by COD

The present invention relates to novel, diamidoquats fabric softening molecules comprising quaternary ammonium center and amide moiety (Formula I) and is an effective fabric conditioning agent which provides fabric softening and smoothening effect through rinse off cycle during fabric wash.

Formula I

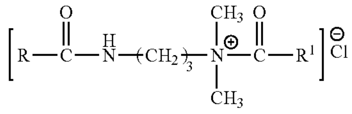

Wherein, R and $R^1$ may or may not be same and are selected from $C_6$ to $C_{24}$ straight or branched alkyl chain or alkenyl residue.

The novel molecule diamidoquats of the present invention render lots of ease in handling in comparison with traditional esterquats. Further, it has been found that fabric conditioning composition comprising diamidoquats give good performance at low concentration as well as at high concentration. Furthermore, diamidoquats of the present invention are homogeneous, stable, flowable and pumpable at both, low and high temperatures. It also delivers antistatic and non-yellowing properties to the fabric post multiwashing cycles.

In another embodiment, the inventors of the present invention surprisingly found that the novel diamidoquats fabric softening molecules also exhibits good antibacterial property.

In one of the embodiments, diamidoquats of the present invention permit the ease of dissolution in water at 40° C. in a considerably higher concentration than esterquats. Thus, a diamidoquats act very good fabric softener and uniformly delivers the smoothness and softness to the fabric. Further, it has been found that fabric conditioning compositions comprising diamidoquats even in the case of low as well as high concentration, are homogeneous, stable, flowable and pumpable at both, lower and higher temperatures. It also delivers antistatic and non-yellowing properties post multi-wash cycles to fabric.

The inventors of the present invention have found that preparing a liquid fabric conditioner formulation by using the quaternary compound having amide linkage as other moiety improves stability and dissolution of molecule. It was surprisingly found that the diamidoquats of the present invention deliver appropriate conditioning benefits to fabric at comparatively low dosage than that of traditional fabric conditioners like esterquats and impart unexpected high temperature stability. It would be unobvious to those skilled in the art to make stable fabric conditioner with superior performance without using esterquats. Thus, the present invention relates to novel molecules diamidoquats, their unique properties and various conditioning formulations prepared using them.

Fabric conditioner formulae containing 3 to 20% cationic molecule of Formula I wherein, R and $R^1$ may or may not be same and are selected from 6 to 24 carbon atoms, straight or branched chain alkyl or alkenyl residue, preferably 8 to 18 and more preferably 12 to 18 carbon atoms.

In one of the embodiments of the present invention, the diamidoquats exhibit an antimicrobial property along with conditioning (softening/smoothening) effect.

Hence, imparting dual benefit to the compositions.

In one embodiment the diamidoquat of the present invention demonstrates antimicrobial activity. The Minimum Inhibitory concentration (MIC) is the lowest dilution which inhibits the growth of microorganism. MIC assays generate a value in μg/mL for the exact, lowest concentration of the antimicrobial agent that prevents the visible growth of bacteria. MIC was detected by using test tube method using different dilution in sterile tryptic soya broth (growth medium). (Ref.: https://www.ncbi.nlm.nih.gov/pmc/articles/PMC7470068/ this link describes about Test tube method of MIC)

The details of the procedure and results are provided as examples

In view of antimicrobial effect, the diamidoquats of present invention are used in various formulations such as laundry care, hard surface cleaning compositions to render dual benefits namely, conditioning effects and antimicrobial effect.

In another embodiment of the present invention, the diamidoquats of Formula I are biodegradable. This addresses many ecotoxicological problems and behaves green towards the environment. Hence advantageous over traditional esterquats. Detailed data as mentioned in the example show that diamidoquats performance is at parity compared to esterquats and are versatile in nature.

It is surprisingly found that combination of quaternary ammonium center and amidobetaine uniquely permits superior deposition on fabric to deliver conditioning without yellowing effect. Further, it has been found that comparatively lower dosage of diamidoquats in the compositions performed better than comparatively higher dosage of esterquats. Low pH, stability over wide temperature range, conditioning performance, antimicrobial properties, biodegradability and ease of handling are the properties of the novel diamidoquats molecules, make them advantageous in home care compositions such as fabric conditioning, surface cleaning etc.

In all fabric care formulations having anionic surfactant as main active component, achieving fabric conditioning property is a difficult task. Esterquats or BKC form complex with anionic compound and precipitate out resulting in the separation. However, diamidoquats, remain uniformly dispersed and do not form any complex. Further, when anionic activity tested, it was found to be same as per dosage added to formula. This shows that certain % diamidoquats are compatible with anionic surfactants and do not lead to separation like traditional fabric softeners.

The compatibility of diamidoquat with anionic surfactants is a great advantage for fabric care formulations. This leads to dual benefit of fabric conditioning compositions containing diamidoquats i.e., both cleansing and conditioning through one composition.

In the present invention, diamidoquat used from about 3% to 60% by weight, preferably from 3 to 20% by weight, and more preferably from 5-10% by weight, based on the weight of the entire composition.

Optional Ingredients for Fabric Conditioner:

To enhance the performance of fabric conditioner, stability and pourability further, minor amounts of other ingredients that are believed not to be detrimental to the invention may be added along with the diamidoquats. Such ingredients can be selected from emulsifiers, emollients, viscosity modifier, preservatives, coloring agents, and additives.

Very small amounts of other additives may be added to the fabric conditioning compositions of the present invention. These additives include but are not necessarily limited to pH adjusting chemicals such as acids, bases and buffers, e.g. sodium hydroxide, citric acid, triethanolamine etc.; lower molecular weight alcohols containing more than one hydroxyl group, e.g. ethylene glycol, propylene glycol, diethylene glycol, triethylene glycol, and glycerin; antioxidants, e.g. BHT; preservatives, e.g. methyl and propyl parabens and the like; inorganic salts, e.g. alkali and alkali metal halides, acetates, carboxylates, sulfonates, and citrates; thickening and conditioning agents such as guar and cellulosic and chemical derivatives of guar and cellulosic.

Fabric conditioner compositions of the present invention comprise the components selected from surfactants, thickeners, emulsifiers, hydrotropes, non-aqueous solvents, electrolytes, pH-adjusting agents, perfume carriers, fluorescent agents, dyes, foam inhibitors, anti-redeposition agents, enzymes, optical brighteners, graying inhibitors, anti-wrinkle inhibitors, anti-crease agents, antimicrobial agents, germicides, fungicides, antioxidants, corrosion inhibitors, antistatic agents, ironing aids, phobing and impregnating agents, swelling and anti-slip agents as well as UV absorbers. The following examples are for illustration purpose but should not be construed to limit the invention. All parts, percentages, ratios in these examples and in the remainder of the specification and claims are by weight unless stated otherwise.

EXPERIMENTAL

The present invention is now described by way of working non-limiting illustrative examples. These examples are provided for illustrative purposes only and are not intended to limit the scope of the invention as defined in the claims below.

Fatty acids are procured from Natural oleochemicals Indonesia, 3-N,N-Dimethylaminopropyldiamine is procured from TAMINCO BVBA and lauroyl chloride and myristoyl chloride are purchased from Galaxy Surfactants Limited, Jhagadia.

EXAMPLES

Example 1: The Diamidoquat is Synthesized by the Following Two Steps

Step I: Synthesis of fatty acid amide of N,N-dimethyl Amido Propyl Amine was carried out as reported in U.S. Pat.

No. 7,534,816B2 by reacting fatty acids with 3-N,N-dimethylaminopropyldiamine. Reaction mass is then cooled to room temperature and subjected quaternization reaction.

Step II: Synthesis of DAQ:

DAQ was obtained by reacting lauric myristic amido propyl amine from step I (291 g) with lauroyl chloride (212.5 g) at 80-100° C. in a reactor where acyl chloride was slowly added to lauric myristic amido propyl amine. On completion of addition, the mass was digested for about 2 hours. The process was monitored by determination of active matter, pH and colour. The % yield of the final product (DAQ) was >99%.

The obtained mass contained about ~93-95% of active matter. Nearly 10% of lauric acid, myristic, palmatic or stearic acid or combinations thereof was added to convert the material into flake form. After completion of step II, the material was flaked on rolling drum flaker provided with chilling water. The material can be packed in air-tight bags at <35° C.

Spectroscopic Data for DAQ:

$^1H$ NMR (400 MHz, DMSO-$d_6$) δ ppm 0.83 (t, 6H, J=6.8 Hz), 1.21 (s, 46H), 1.45 (t, 4H, J=6.8 Hz), 1.75 (m, 2H), 2.04 (t, 2H, J=7.6 Hz), 2.16 (t, 2H, J=7.6 Hz), 2.68 (s, 3H), 2.69 (s, 3H), 2.97 (m, 2H), 3.06 (m, 2H), 7.96 (s, 1H).

The formation of the diamidoquat was further confirmed by $^{13}C$ NMR spectroscopy, APT (attached proton test) on an Agilent-400 MHz (100 MHz) spectrometer, using the signal of DMSO-$d_6$ for calibration (δ=39.52 ppm centerline). Both the carbonyl groups of the final product appeared at 172.41 ppm and 174.15 ppm.

Example 2 Antimicrobial Effect

Procedure in Brief:

Working stock preparation: 1% in sterile D/W

Diluent: Sterile tryptic soy broth

Dilution range: 0.1% to 1%, further diluted to 100 ppm to 1000 ppm

Addition of culture: 0.1 mL of 18-24 hours old culture

Incubation temperature and time:

Bacteria: 37° C. for 24-48 hours

Y/M: 22.5° C. for 48-72 hours

The minimum inhibitory concentration (MIC) of Diamidoquat (DAQ), Benzalkonium chloride (BKC) and Esterquat (EQ) is shown in Table 1.

TABLE 1

MIC determination:

| Test Organism | BKC | Esterquat | Diamidoquat |
|---|---|---|---|
| *S. aureus* ATCC 6538 | 0.6% | 0.6% | 0.5% |
| *E. coli* ATCC 10142 | 0.7% | 0.5% | 0.6% |
| *P. aeruginosa* ATCC 9372 | 0.7% | 0.8% | 0.7% |
| *C. albicans* ATCC 10231 | 0.7% | 0.8% | 0.7% |
| *A. niger* ATCC 16404 | 0.7% | 0.8% | 0.7% |
| Overall MIC | 0.7% | 0.8% | 0.7% |

Antimicrobial efficacy of diamidoquat was studied as per MIC standard protocol. The MIC values for diamidoquat are as shown in the Table 1.

Antimicrobial efficacy of diamidoquat is demonstrated by its MIC value 0.7% which is comparable against well-known antimicrobial agent BKC. This demonstrates that the novel molecule delivers antimicrobial effect.

Example 2: Bio-Degradability Study

Example 2 A: COD (Chemical Oxygen Demand) Analysis

Sample Preparation:

Sample concentration: 1% [10000 ppm]

Period of study: 28 days

Measurement: COD and BOD analysis after every 7 days

Culture: Activated sludge sample

Procedure:

1. Take 2 to 3 g of Mercury sulphate in both blank and sample COD tubes.
2. Add 20 mL of blank and sample in respective tubes.
3. Add 30 mL of COD acid.
4. Add 10 mL of potassium dichromate in each tube.
5. Keep both tubes in COD digester for 1 and half hour.
6. After cooling titrate the solutions against FAS solution using ferrous indicator.
7. Note the BR readings.

Calculations:

1. COD (mg/L)=(BR of blank−BR of sample) (N)×8,000/sample size (mL)
2. % reduction=initial−final/initial*100

TABLE 2

COD data

| Days | EQ (COD Reduction %) | DAQ (COD Reduction %) |
|---|---|---|
| 0 to 7 | 17.11 | 54.30 |
| 0 to 14 | 20.16 | 60.16 |
| 0 to 21 | 27.94 | 61.86 |
| 0 to 28 | 45.81 | 69.98 |

Results and Interpretations:

Study was carried out to determine the degradability of diamidoquat and esterquat.

To determine degradability of the surfactants, COD of each surfactant was performed on $0^{th}$, $7^{th}$, $14^{th}$, and $28^{th}$ day. The COD values, as shown in the above (Table 2) and FIG. 1A, of both the samples were found decreasing from day 0 to day 28 and the percent reduction of diamidoquat and esterquat was found to be 69.98% and 45.81% on $28^{th}$ day respectively. Hence, on the basis of data obtained it could be concluded that both the surfactants diamidoquat and esterquat are found to be degradable. Further, diamidoquat is more degradable than esterquat with is known to have biodegradability.

Example 2B: BOD Analysis

Enrichment:

Materials:

Sample conc.: Surfactant solution 100 mg/L

Diamidoquat=90% (purity)

Esterquat=90% (purity)

Culture conc: Activated sludge (50 mg/L)

Glassware: conical flasks, micro pipettes

Media: Inorganic media supplemented with cationic surfactant as a source of carbon Method:

Prepare solution A to D

Solution A: In 100 mL add $KH_2PO_4$—0.85 g $K_2HIPO_4$—2.17 g $Na_2IPO_4$—3.3 g Ammonium chloride—2.75 g Solution B: In 100 mL add $MgSO_4$—2.25 g Solution C: In 100 mL add Anhydrous $CaCl_2$—2.7 g Solution D: In 100 mL add $FeCl_3$—0.025 g a. Add 0.3 ml each of above solution in a sterile flask. Add sterile D/W to make the total volume 300 ml (294.3 ml).
b. Add 3 mL of 1% surfactant solution in above media
c. Add 1.5 mL of activated sludge
d. Incubate the media under shaking condition for 48 hours
e. Transfer 1.5 mL of the enriched culture to fresh medium and incubate the media under shaking condition for 48 hours.
f. Transfer 1.5 mL of the enriched culture from second enrichment broth and carry out BOD for $0^{th}$, $3^{rd}$, $7^{th}$, $14^{th}$, $21^{st}$, and $28^{th}$ day BOD (Biological Oxygen Demand)

Materials:

1. Aerated water
2. Chemicals: Magnesium sulphate
   Calcium chloride
   Buffer phosphate
   Ferric chloride
   Manganese sulphate
   Alkali azide
   Ortho phosphoric acid
   $Na_2S_2O_3$
   Starch indicator
3. Glassware: BOD bottles, burette, pipette Methods:

1. Aerate 2 liters of water for 3 hours
2. Add Magnesium sulphate, Calcium chloride Buffer phosphate and Ferric chloride each 2 mL and mix properly
3. Take 6 BOD bottles and label 2 bottles as blank and 4 for sample analysis.
4. Carry out $0^{th}$ day analysis of sample and blank. And keep other 3 bottles for 3 days incubation.
5. Add 2 mL of manganese sulphate and 2 mL of alkali azide in blank and sample. Mix properly and allow the precipitate to settle.
6. Add 2 mL of ortho phosphoric acid and mix properly.
7. Take 100 mL of the solution in conical flask and add 2 to 3 drops of starch indicator.
8. Titrate it against $Na_2S_2O_3$
9. End point: yellow to colorless
10. Repeat the same procedure for sample incubated for the 3 days.
11. Calculate the DO
12. Repeat the procedure on $3^{rd}$, $7^{th}$, $14^{th}$, $21^{st}$, and $28^{th}$ day of the enriched sample.

Calculations:

$$DO = BR*N*\text{equivalent weight of Oxygen (ppm)}$$

$$BOD = (D_1-D_2)-(B_1-B_2)*\text{DF/Vol of Sample}$$

$D_1$: Dissolved oxygen of sample on zero day $D_2$: Dissolved oxygen of sample after 3 days incubation $B_1$: Dissolved oxygen of blank on zero day $B_2$: Dissolved oxygen of blank after 3 days incubation $$\%\ \text{reduction} = \text{initial}-\text{final}/\text{initial}*100$$

TABLE 3

| Days | Product: DAQ % Reduction in BOD |
|---|---|
| 0 to 3 | 42.1 |
| 0 to 7 | 68.4 |
| 0 to 14 | 77.1 |
| 0 to 21 | 77.6 |
| 0 to 28 | 78.9 |

Figure 1B:
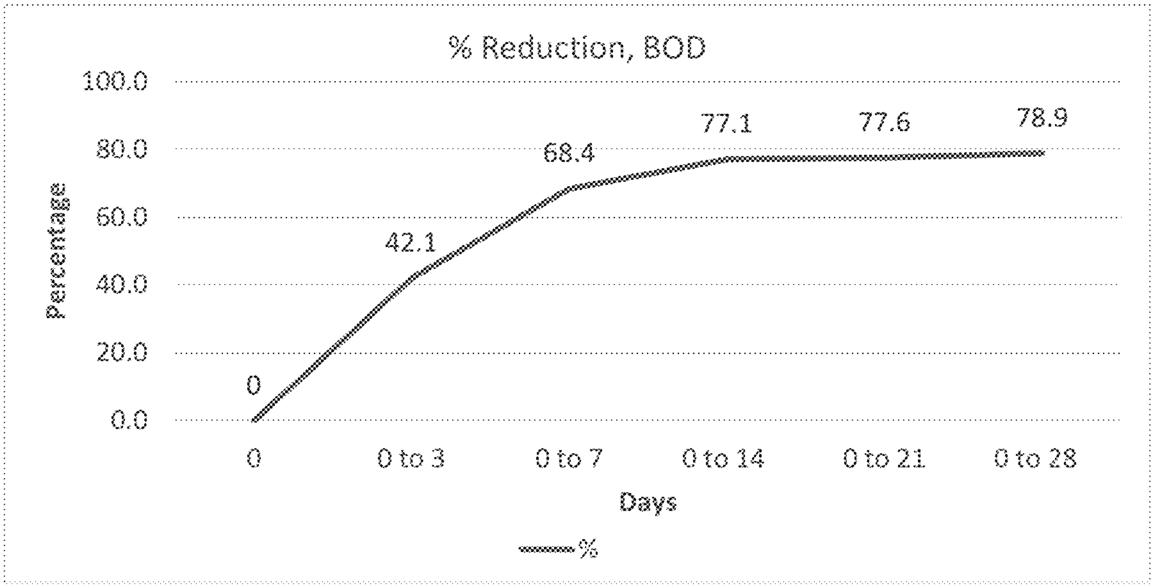
FIG. 1B: Percentage reduction by BOD

Diamidoquat demonstrated biodegradability as after 28 days reduction in biological oxygen demand was observed, it was ~80% reduction as evident from above (Table 3) and FIG. 1B.

Example 3 to 8: Fabric Conditioner/Softener

Fabric conditioning compositions with diamidoquats of the present invention are prepared and shown in the below (Table 4). They are pourable and pumpable liquids and are opaque, stable after long time storage of three months at different temperature conditions, 5° C. to 40° C. No precipitation of active components was observed. They overcome the limitations of high temperature storage stability and performance with low dosage, demonstrated in the Table 4. They all are pourable and pumpable liquids and stable after long time storage at different conditions. No precipitation of active component occurs. They overcome the limitations especially of high temperature storage stability and performance with low dosage.

TABLE 4

| Fabric conditioner/softener formulations | | | | | | | |
|---|---|---|---|---|---|---|---|
| | | As per invention- (Fabric softener Compositions with DAQ) | | | Comparative examples (Fabric softener Compositions with EQ) | | |
| Sr. No. | Composition | Ex. 3 3% DAQ | Ex. 4 5% DAQ | Ex. 5 10% DAQ | Ex. 6 Placebo (without conditioner) | Ex. 7 5% EQ | Ex.8 10% EQ |
| 1 | Diamidoquat (Novel molecule) | 3 | 5 | 10 | 0 | 0 | 0 |
| 2 | Esterquat (STEPAN TE SP 90) | 0 | 0 | 0 | 0 | 5 | 10 |

TABLE 4-continued

Fabric conditioner/softener formulations

| Sr. No. | Composition | As per invention- (Fabric softener Compositions with DAQ) Ex. 3 3% DAQ | Ex. 4 5% DAQ | Ex. 5 10% DAQ | Comparative examples (Fabric softener Compositions with EQ) Ex. 6 Placebo (without conditioner) | Ex. 7 5% EQ | Ex.8 10% EQ |
|---|---|---|---|---|---|---|---|
| 3 | Glyceryl monostearate | 1 | 1 | 1 | 1 | 1 | 1 |
| 4 | Cetostearyl alcohol | 2.5 | 2.5 | 2.5 | 2.5 | 2.5 | 2.5 |
| 5 | Dimethiocone | 0.5 | 0.5 | 0.5 | 0.5 | 0.5 | 0.5 |
| 6 | Dowsil MW 2220 | 0.5 | 0.5 | 0.5 | 0.5 | 0.5 | 0.5 |
| 7 | Acetic Acid | 0.5 | 0.5 | 0.5 | 0.5 | 0.5 | 0.5 |
| 8 | Tween 80 | 2 | 2 | 2 | 2 | 2 | 2 |
| 9 | Surcide cp | 0.2 | 0.2 | 0.2 | 0.2 | 0.2 | 0.2 |
| 10 | GalMOL CCT | 1.5 | 1.5 | 1.5 | 1.5 | 1.5 | 1.5 |
| 11 | Triquat 10 L | 0.2 | 0.2 | 0.2 | 0.2 | 0.2 | 0.2 |
| 12 | Colour (blue) | q.s. | q.s. | q.s. | q.s. | q.s. | q.s. |
| 13 | D.M. Water | 87.1 | 85.1 | 80.1 | 90.1 | 85.1 | 80.1 |
| 14 | Total | 100 | 100 | 100 | 100 | 100 | 100 |
| 15 | pH | 2.5 to 3.5 | | | | | |
| 16 | Viscosity | 200 cps to 1000 cps | | | | | |
| 17 | Appearance of FC stored @ 25° C., 0 day | Opaque, flowable, stable | Opaque, flowable, stable | Opaque, flowable, stable | Opaque, flowable, stable | Opaque, flowable, stable | Opaque, flowable, stable |
| 18 | Appearance of FC stored @ 25° C., 60 days | Opaque, flowable, stable | Opaque, flowable, stable | Opaque, flowable, stable | Opaque, flowable, stable | Opaque, flowable, stable | Opaque, flowable, stable |
| 19 | Appearance of FC stored @ 40° C., 0 day | Opaque, flowable, stable | Opaque, flowable, stable | Opaque, flowable, stable | Opaque, flowable, stable | Opaque, flowable, stable | Opaque, flowable, stable |
| 20 | Appearance of FC stored @ 40° C., 60 days | Opaque, flowable, stable | Opaque, flowable, stable | Opaque, flowable, stable | Opaque, flowable, stable | Opaque, flowable, stable | Opaque, flowable, slight separation |

FC: Fabric Conditioner/Softener

The above compositions prepared using the novel diamidoquat of the present invention, are particularly suited for use in fabric care applications such as fabric conditioners.

These compositions of diamidoquat Vs traditional conditioning agent esterquats were studied and compared at the different dosage for various properties. As evident from the Table 4, the compositions of the present invention containing diamidoquat overcome all the challenges of traditional fabric softeners such as flowability, appearance and stability on storage especially at higher temperature.

Performance of Fabric Conditioner Formulations—Diamidoquat Vs Esterquat

Method A: Substantivity of Red Dye on Wool Fabric

Procedure:

Dye used: 0.5% Direct Red 80 dye solution in distilled water

Fabric Softener Solution: 1% in Distilled Water

Cotton Wool Swatches: 5×5 cm

Figure 2:
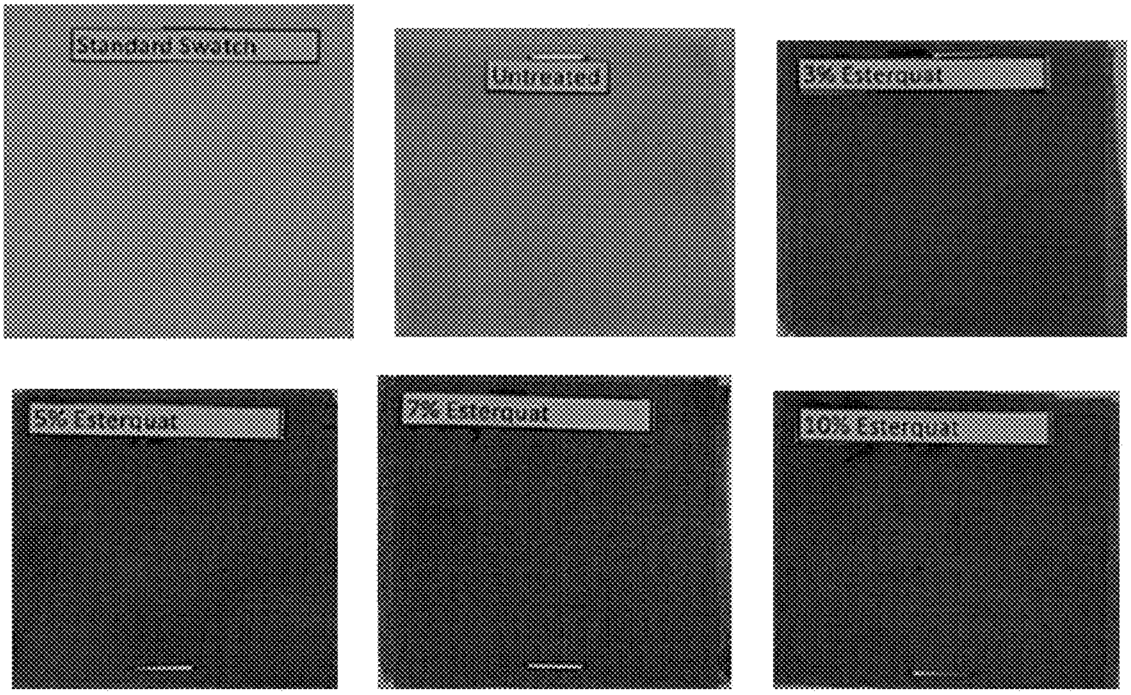
FIG. 2: Esterquat formulations at different dosage studied for deposition of cationic molecule

After drying reflectance measured by UV spectrophotometer, Model—Konica Minolta Interpretation: Higher the dE value better the substantivity and so performance Photographs of Swatches:

The Esterquat formulations at different dosage studied for deposition of cationic molecule and it has been showed in FIG. 2.

Figure 3:
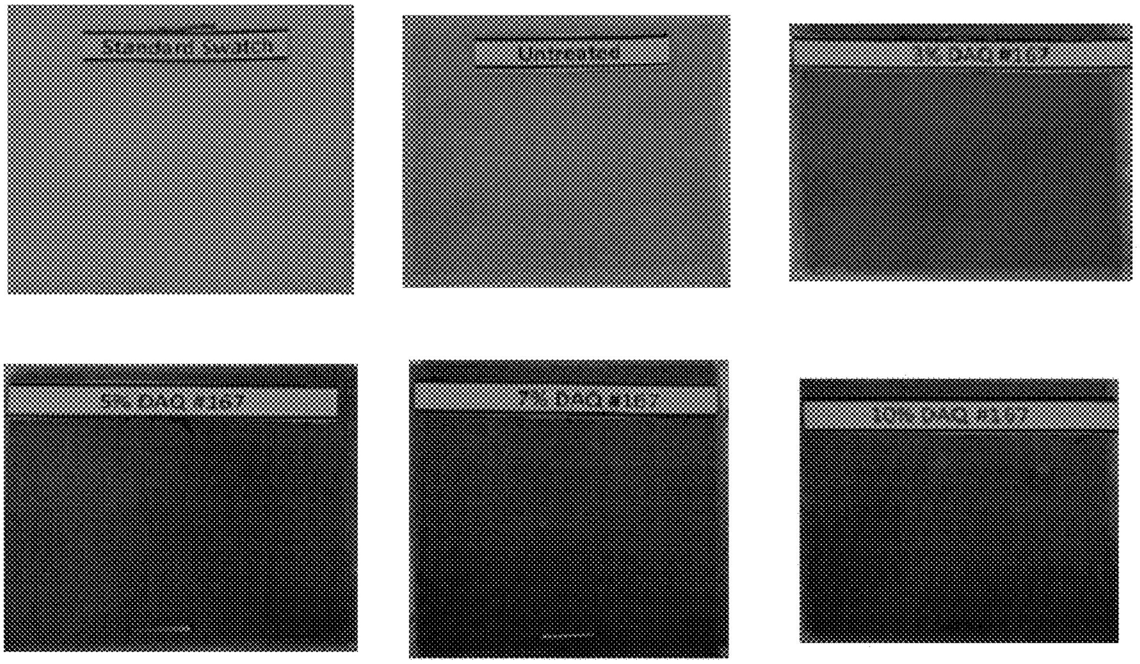
FIG. 3: Diamidoquat formulations at different dosage studied for deposition of cationic molecule

The Diamidoquat formulations at different dosage studied for deposition of cationic molecule, showed good deposition as described in FIG. 3.

Results:

Esterquat deposition is slightly higher than diamidoquat but softness/smoothness of fabric remains same.

This study shows esterquat has deposition is slightly higher than diamidoquat. However, diamidoquat is equally substantive and shows better sensory even at lower dosage compared to esterquat.

Hence fabric conditioning experience is much better when diamidoquat added to the formulation.

TABLE 5

Substantivity study data:

| Sr. No. | Sample Name | Prewash CIE 76 | Post wash CIE 76 | dE |
|---|---|---|---|---|
| 1 | Untreated | 20.48 | 23.43 | 2.95 |
| 2 | 3% EQ | 20.48 | 44.23 | 23.75 |
| 3 | 5% EQ | 20.48 | 44.19 | 23.71 |
| 4 | 7% EQ | 20.48 | 43.45 | 22.97 |
| 5 | 10% EQ | 20.48 | 44.51 | 24.03 |
| 6 | 3% DAQ | 20.48 | 37.51 | 17.03 |
| 7 | 5% DAQ | 20.48 | 43.21 | 22.73 |
| 8 | 7% DAQ | 20.48 | 46.17 | 25.69 |
| 9 | 10% DAQ | 20.48 | 47.21 | 26.73 |

*dE = CIE index (reflectance value) Postwash − Prewash

From substantivity data, as evident from dE in the above table, it was observed that novel molecule diamidoquat performs similar and at par against traditional esterquat but show better substantivity at moderate concentrations of about 5% and 7%. As deposition of molecule on fabric reflects visually comparable and data also demonstrated similar results.

Figure 4:
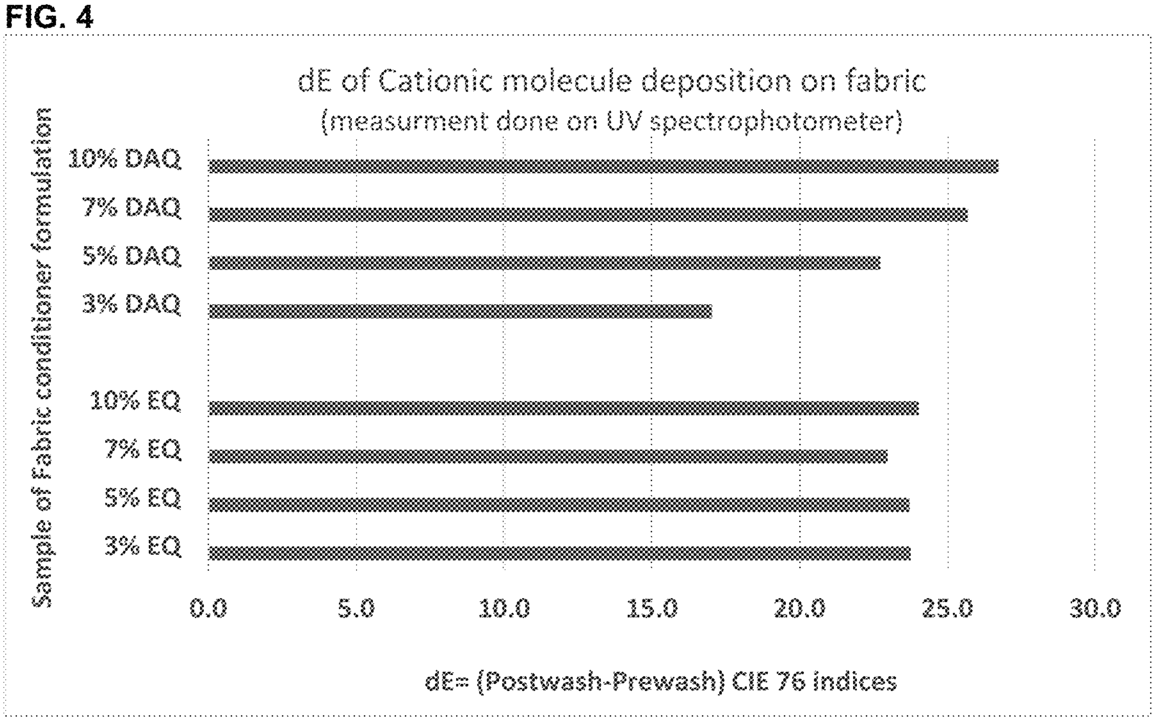
FIG. 4: Substantivity data: dE of cationic molecule deposition on fabric
Figure 5:
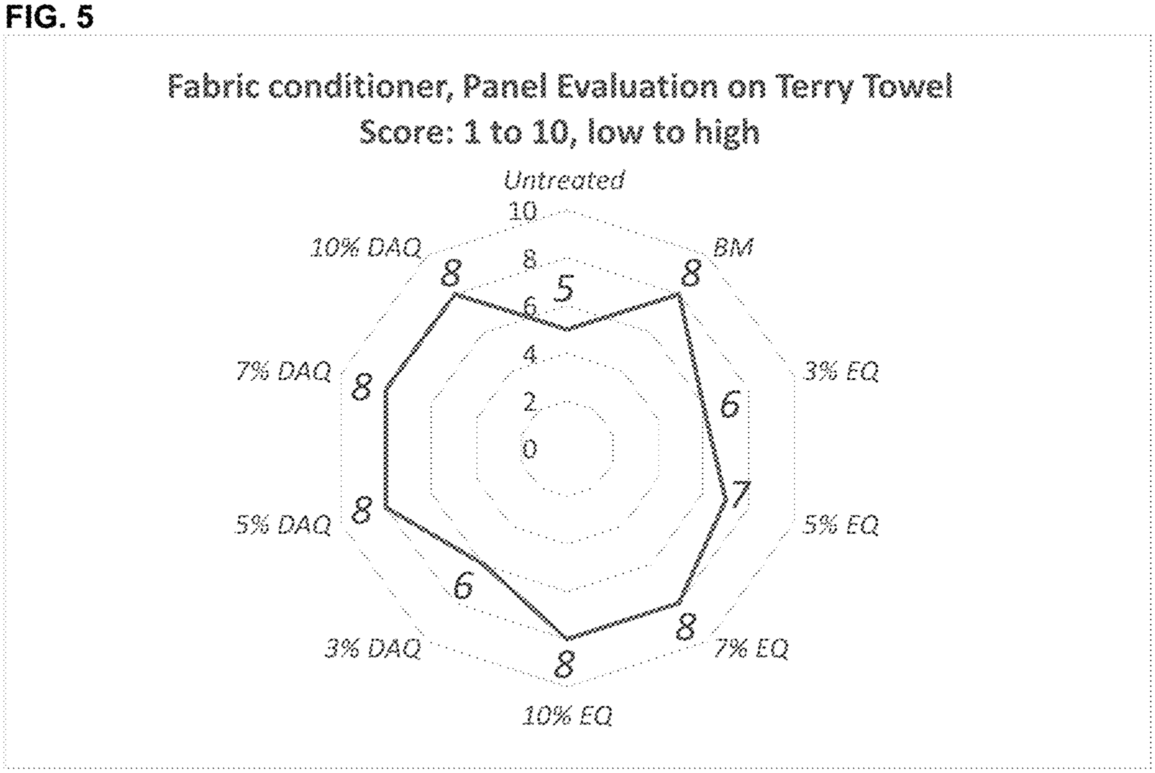
FIG. 5: Graphic representation of panel sensory evaluation scores of fabric conditioner on Terry towel
Figure 6:
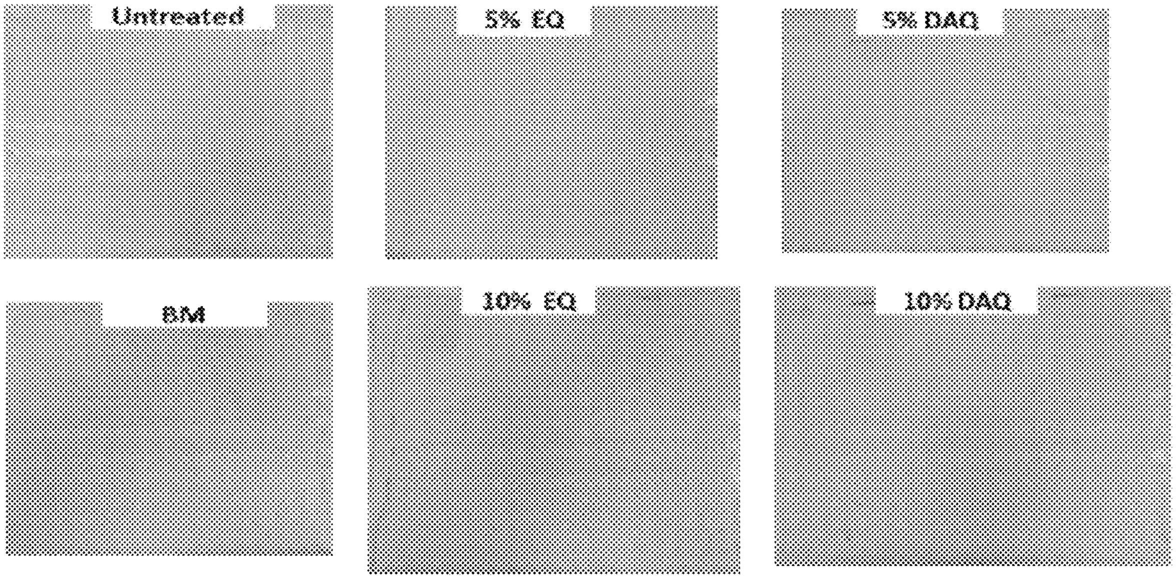
FIG. 6: Terry towel sensory panel evaluation for softening improvement

The FIG. 4 demonstrates that 5 to 7% diamidoquat substantivity is almost similar while diamidoquat has better substantivity than esterquat at 7 and 10%.

Panel Sensory Evaluation:
Procedure:

Fabric: Terry towel, Cotton napkins
Fabric Softener: 2 mL in 1 Liter Tap Water
Duration: 5 minutes
Samples/Swatches (Rated out of 10 as per the softness of Same Terry Fabric before and after drying)
Number of panel members: n=12

Novel molecule delivered softness and smoothness similar to esterquat and from sensory panel evaluation study data, it was observed that diamidoquat performed equivalent against esterquat.

Diamidoquat also performs better even at lower dosage i.e. 7%, it has shown enhanced sensory feel on terry towel compared to 10% esterquat based formulation.

Example 9

Surface cleaner (prepared by incorporating the novel diamidoquat into the base formulations).

Home Care formulation - Surface cleaner

| Sr. No. | Ingredient | % W/W |
|---|---|---|
| 1 | Galaxy MW 257 | 4.00 |
| 2 | Galaxy CAPB SB | 1.50 |
| 3 | DAQ | 2.00 |
| 4 | Tetra sodium EDTA | 0.15 |
| 5 | Water | 91.85 |
| 6 | Colour solution | q.s. |
| | Total | 100 |

The above formulation was then evaluated to show the antimicrobial effectiveness imparted to hard surface such as floor or tiles. The substantive diamidoquat compound shows superior antimicrobial effect.

This invention may be embodied in other forms or carried out in other ways without departing from the spirit or essential characteristics thereof. The embodiments given hereinbefore are therefore to be considered as in all respects illustrative and not restrictive, the scope of the invention being indicated by the appended claims, and all changes which come within the meaning and range of equivalency are intended to be embraced therein.

We claim:

1. A substantive diamidoquat molecule of Formula I,

Formula I

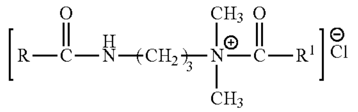

wherein R and $R^1$ may or may not be the same and are selected from $C_6$ to $C_{24}$ straight or branched alkyl chains or alkenyl residues.

2. The diamidoquat molecule of claim 1, wherein R and $R^1$ are each $C_{12}$ to $C_{18}$.

3. The diamidoquat molecule of claim 1, wherein the molecule has a fabric softening and antimicrobial property.

4. A home care composition comprising the diamidoquat molecule of claim 1.

5. The home care composition of claim 4, further comprising one or more components selected from the group consisting of emulsifiers, thickening agents, fabric conditioning agents, surfactants, rheology modifiers, stabilizers, color, and fragrance.

6. The home care composition of claim 4, comprising the diamidoquat molecule of Formula I in an amount ranging from 3 to 60% by weight of the composition.

7. The home care composition of claim 6, comprising the diamidoquat molecule of Formula I in an amount ranging from 3 to 20% by weight of the composition.

8. The home care composition of claim 4, wherein the composition is selected from a fabric softener, a hard surface cleaner, a dish wash, and an industrial and institutional cleaning composition.

* * * * *